UNITED STATES PATENT OFFICE.

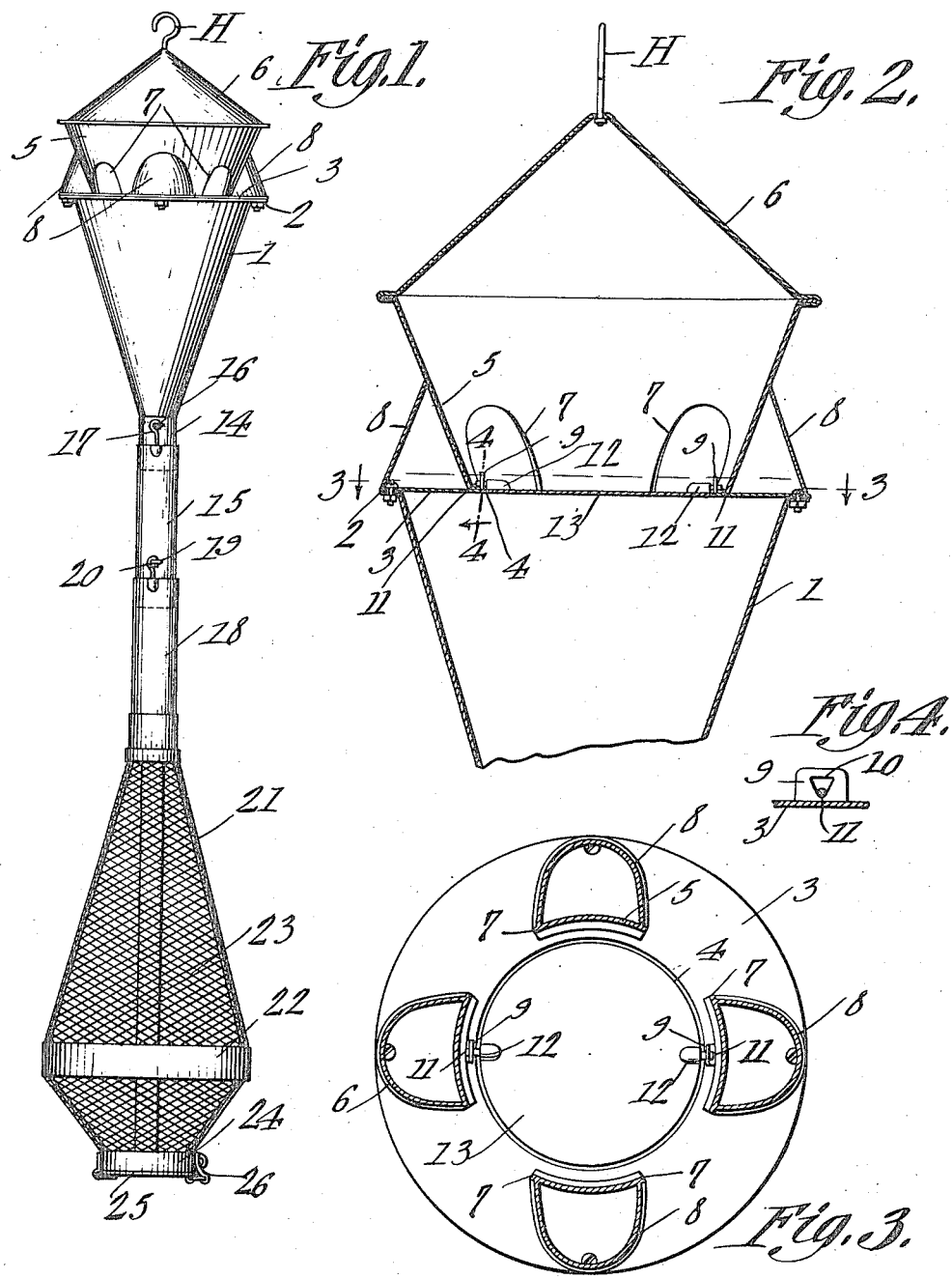

JOHN A. TOOLEY, OF SHREVEPORT, LOUISIANA.

BIRD-TRAP.

1,155,017. Specification of Letters Patent. Patented Sept. 28, 1915.

Application filed February 2, 1915. Serial No. 5,753.

*To all whom it may concern:*

Be it known that I, JOHN A. TOOLEY, a citizen of the United States, residing at Shreveport, in the parish of Caddo and State of Louisiana, have invented a new and useful Bird-Trap, of which the following is a specification.

The present invention relates to improvements in bird traps, one object of the invention being the provision of a form of trap, in which a decoying chamber is provided with a trap door, so that the bird when entering the decoy chamber will be precipitated into a directing member of the trap and finally into a captivity chamber where the bird may be released when desired.

A further object of the preset invention, is the provision of a bird trap, composed of a plurality of telescopic sections so that the same may be readily taken apart and collapsed, such telescopic sections also forming a guiding means for the captured bird into a captivity chamber which is disposed below the decoying chamber of the device.

A still further object of the invention, is the provision of a trap of this character, which is simple, inexpensive and durable in construction, and which is therefore thoroughly efficient and practical in use.

With the foregoing and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed without departing from the spirit of the invention.

In the drawings—Figure 1 is a side elevation of the complete device with the parts in assembled position. Fig. 2 is an enlarged vertical central sectional view through the decoying chamber and the upper portion of the trap door chamber. Fig. 3 is a section taken on line 3—3 of Fig. 2. Fig. 4 is a section taken on line 4—4 of Fig. 2.

Referring to the drawings, the funnel shaped chamber 1 is provided with an outstanding flange or rim 2, to which is connected the flat annular disk 3 provided with the centrally disposed opening 4. Carried by the member 3 is a frusto-conical casing 5, which with the dome 6 constitutes the decoying chamber of the present device.

The present device is supported by means of the hook H which is connected to the dome 6.

In the walls of the member 5 are provided a plurality of equi-distantly disposed entrance openings 7, while connected to the exterior thereof and projecting to the extreme edge of the member 3 are a plurality of curved plates 8, which provide a means to prevent the birds from perching at any point of the plate 3 except directly in front of the inlet openings 7.

Disposed at diametrically opposite points of the opening 4 and projecting upwardly at right angles to the inner edge of the member 3, are the two lugs 9, each of which is provided with the inverted triangular shaped opening 10, as clearly illustrated in Fig. 4. Disposed in the openings 10 so as to rest within the lower angle thereof, are the pintles or journals 11, which are attached by means of the abutments 12 at diametrically opposite points to the circular trap door or disk 13. This disk 13 substantially seals or closes the opening 4 so that when the bird to be captured enters one of the apertures 7 of the decoy chamber 5, and rests upon the trap door 13, the same will be overbalanced so as to project the bird through the opening 4 into the member 1.

The lower end of the member 1 is provided with the cylindrical guiding tube or spout 14, which telescopically fits within the tube 15, there being provided diametrically disposed eye members 16 for the reception of the hooks 17 carried by the tube 15, so the parts may be assembled and held in the depending position as shown in Fig. 1. The lower end of the tube 15 telescopically fits into the tube 18, and is properly held in place by means of the eyes 19 and the hooks 20.

Carried upon the lower end of the tube 18 is the frame 21 which has the expanding band 22, so that the wire gauze or net 23 may be properly suspended to form a captivity chamber at the lower end of the present device. A band 24 is disposed in the lower end of the captivity chamber and is closed by a hinge cover 25 which is locked in place by means of the catch 26.

It will thus be seen that a bird precipitated into the member 1 will be guided downwardly into and through the respective tubular members 14, 15 and 18, and consequently into the captivity chamber therebelow, where the same may be removed by the opening of the closure 25, whereby the bird may be released by hand or into any other desired inclosure.

By constructing the sections 14, 15 and 18 as illustrated, the normal gravity weight of the captivity chamber will hold the parts assembled in the position as shown, while the hook H will permit the present device to be hung upon the eaves, or the branches, or in fact any place where the birds may perch upon the annular portion 3 at one of the respective openings 7 of the decoying chamber 5.

Where so desired, there may be placed upon the trap door 13 bait so that the bird will more readily enter within the decoying chamber to be precipitated into the captivity chamber.

What is claimed is:

A bird trap, including a decoying chamber having a lower trap door, a funnel-shaped member attached to said chamber below said trap door, a captivity chamber below the funnel-shaped member and having a lower door, and a tubular guiding member connecting the spout of the funnel-shaped member and the upper portion of the captivity chamber.

In testimony that I claim the foregoing as my own, I have hereto affixed my signature in the presence of two witnesses.

JOHN A. TOOLEY.

Witnesses:
  CLARE C. CLARK,
  J. W. McMURPHY.